Jan. 5, 1932.  R. F. BACON  1,840,076
RECOVERY OF SULPHUR FROM SULPHUR DIOXIDE
Filed April 6, 1927
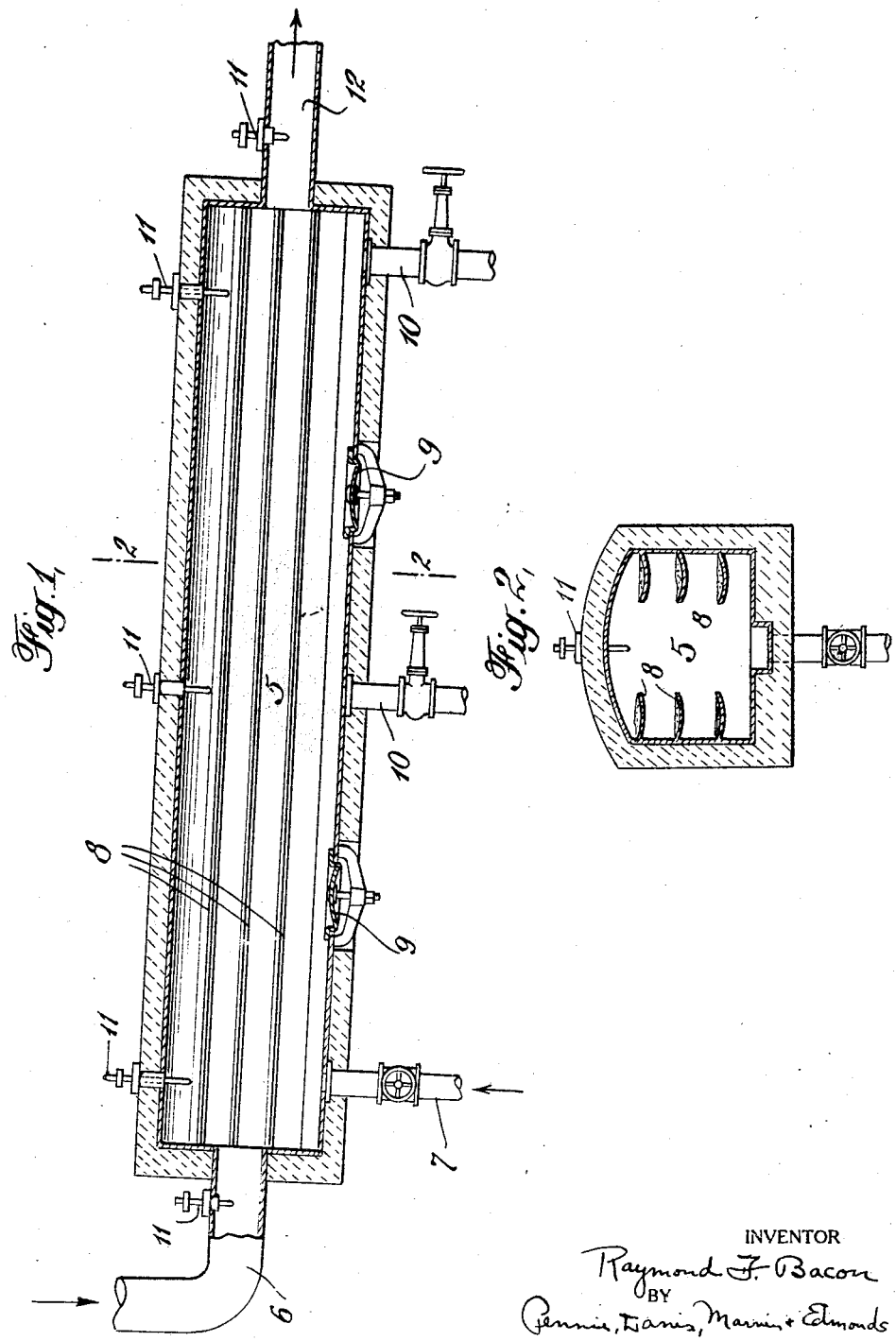
INVENTOR
Raymond F. Bacon
BY
Pennie, Davis, Marvin & Edmonds
ATTORNEYS Patented Jan. 5, 1932

1,840,076

UNITED STATES PATENT OFFICE

RAYMOND F. BACON, OF BRONXVILLE, NEW YORK

RECOVERY OF SULPHUR FROM SULPHUR DIOXIDE

Application filed April 6, 1927. Serial No. 181,360.

This invention relates to the recovery of sulphur from sulphur dioxide gas or from gas mixtures containing sulphur dioxide such as roaster gases. The invention has for its object the provision of an improved method of recovering sulphur, principally in elemental form, from sulphur dioxide. More particularly the invention aims to provide an improved method of recovering sulphur in elemental form from sulphur dioxide gas by the reducing action of hydrogen or by a gas consisting largely of hydrogen.

When hydrogen, or a gas consisting largely of hydrogen, and sulphur dioxide are heated together, as for example by passing the two gases through a heated tube or retort, the hydrogen does not reduce the sulphur dioxide until a relatively high temperature is reached. Thus, I have found that substantially no reaction takes place at temperatures below 500° C., and the reaction proceeds only very slowly until considerably higher temperatures are employed. Moreover, if oxygen is present in the reacting gas mixture, as will be the case in roaster gases containing sulphur dioxide, the temperature required for substantial reaction between sulphur dioxide and hydrogen will be so high that reaction will also take place between the hydrogen and the oxygen, whereby the hydrogen is consumed to no useful purpose.

I have found that the reaction between hydrogen and sulphur dioxide can be substantially promoted by an appropriate catalyst, and I have discovered that elemental sulphur is admirably adapted to serve as the catalytic agent. Thus, I have found that when hydrogen and sulphur dioxide are passed through a heated tube or retort in the presence of a suitable catalyst such as elemental sulphur, the hydrogen reacts with the sulphur dioxide at temperatures as low as 200 to 250° C.; that is much below temperatures at which hydrogen reacts with oxygen to form water.

My present invention is based on the foregoing discoveries, and involves the production of elemental sulphur by subjecting sulphur dioxide to the action of hydrogen at a temperature not exceeding 500° C., and preferably above 200° C., in the presence of a catalyst such as elemental sulphur. The sulphur dioxide may be obtained from any appropriate source, and may be associated with oxygen, as will be the case when derived from the roasting of sulfide ores. Steam or water vapor may also be present in the reacting gases. The presence of copper or iron, or both, is also of advantage in promoting the desired reaction between the sulphur dioxide and hydrogen.

In practicing the invention I have found a good operating temperature to be about 250° C. Where roaster gases are employed as the source of the sulphur dioxide, they should contain as high a percentage of sulphur dioxide as commercially possible. The roaster gases may be cooled or allowed to cool to approximately the desired reacting temperature, and then brought into contact with the hydrogen in any appropriate form of apparatus, in the presence of the catalyst. I have found it satisfactory to mix the roaster gases, appropriately cooled to a temperature approximating 250° C., with hydrogen gas in a reaction chamber containing elemental sulphur appropriately exposed to the reacting gases, as for example disposed on baffles, or shelves, or even on the bottom of the chamber.

The reaction between the sulphur dioxide and the hydrogen then takes place in which the hydrogen reduces the sulphur dioxide with the production of elemental sulphur. The sulphur will partly collect in the reaction chamber and will partly be carried along by the gases exiting from the chamber. The sulphur collecting in the chamber may be removed from time to time, and the sulphur suspended in the exiting gases may be removed therefrom and collected by any appropriate means of removing solid particles from gases in which they are suspended, as, for example, by electrical precipitation, cyclones or collecting chambers, bag house practice etc.

The hydrogen gas may be produced in any suitable manner. It is not necessary, of course, that pure hydrogen gas be employed, but a gas consisting largely of hydrogen is entirely satisfactory. Thus, water gas may be employed, or more advantageously hydrogen prepared from water gas by the methods utilized in the synthetic ammonia industry. These and similar methods for the commercial preparation of hydrogen are well known. The amount of hydrogen gas used may advantageously be that required by stoichiometrical calculation to satisfy the sulphur dioxide content of the reacting gas mixture.

Steam may be introduced into the reaction chamber with the hydrogen, or in any other suitable manner. The presence of steam or water vapor during the reaction has two advantageous effects. In the first place, the steam or water vapor raises the ignition temperature of sulphur, and in addition and entirely apart from that the presence of steam or water vapor appears to accelerate the complicated reactions which take place during the reduction of sulphur dioxide by hydrogen at the relatively low temperatures contemplated by the invention. It is also advantageous to the reaction to have copper or iron present alone or together as well as in conjunction with the steam. Increase of pressure exercises a favorable effect upon the reaction, and pressures substantially greater than atmospheric pressures may, consequently, be employed to promote the reaction. Agitation of the reacting gas mixture is also of advantage.

With roaster and similarly produced gases containing sulphur dioxide, the gases themselves will ordinarily carry sufficient heat for establishing and maintaining the desired conditions of temperature during the reaction. In other cases, heat may be applied to the reacting gases in any suitable manner, as for example by conducting the reaction in an externally heated chamber or retort, or by preliminary heating one or both of the reacting gases.

Various types and forms of apparatus may be used in practicing the invention. I have shown in the accompanying drawings an apparatus that is satisfactory for the purpose.

In the drawings

Fig. 1 is a longitudinal section of the apparatus, and

Fig. 2 is a cross-section of the apparatus.

The apparatus illustrated in the drawings consists of a relatively long reaction chamber 5 embodied in a suitable structure for effectively conserving heat and resisting any corrosive effects of the reacting gas mixture. The roaster or other gases containing sulphur dioxide are introduced into the chamber 5 from a supply main 6, and hydrogen is simultaneously introduced into the chamber through a pipe 7.

The chamber 5 is provided with a plurality of longitudinally extending shelves 8 for holding elemental sulphur acting as the catalytic material. The bottom of the chamber is provided with manholes 9, for cleaning out the chamber or for removing the accumulated sulphur from the chamber. Valved outlets 10 also communicate with the bottom of the chamber 5.

Pyrometers 11, or other appropriate temperature measuring and indicating devices, are provided for observing the temperature of the entering and exiting gases, and of the reacting gas mixture at different points in the reaction chamber. The exhaust or exiting gases are removed from the chamber through a gas outlet 12.

Under my preferred conditions of operation, the temperature within the chamber 5 will be above the melting temperature of sulphur. Consequently, the elemental sulphur accumulating in the chamber will be fused or molten, and may be withdrawn, from time to time, through the outlets 10. The catalytic sulphur will also be molten, and for this reason the shelves 8 are concaved or otherwise appropriately designed to hold suitable amounts of molten sulphur thereon.

I claim:—

1. The method of recovering sulphur which comprises subjecting sulphur dioxide to the action of hydrogen in the presence of molten sulphur, thereby reducing the sulphur dioxide and producing elemental sulphur.

2. The method of recovering sulphur which comprises subjecting sulphur dioxide to the action of hydrogen at a temperature of about 250° C. and in the presence of molten sulphur, thereby reducing the sulphur dioxide and producing elemental sulphur.

3. The method of recovering sulphur which comprises subjecting sulphur dioxide to the action of hydrogen at a temperature of about 250° C. and in the presence of cuprous sulphide, thereby reducing the sulphur dioxide and producing elemental sulphur.

4. The method of recovering sulphur which comprises subjecting sulphur dioxide to the action of hydrogen at a temperature of about 250° C. and in the presence of molten sulphur and cuprous sulphide, thereby reducing the sulphur dioxide and producing elemental sulphur.

In testimony whereof I affix my signature.

RAYMOND F. BACON.